United States Patent
Kaplo et al.

(10) Patent No.: US 7,419,555 B2
(45) Date of Patent: *Sep. 2, 2008

(54) PILE WEATHERSTRIPPING MANUFACTURING APPARATUS AND METHOD

(75) Inventors: Joseph Kaplo, Hampton, NH (US); Joseph Henry, Mooresville, NC (US); Randy Wayne Privette, Statesville, NC (US)

(73) Assignee: Amesbury Group, Inc., Amesbury, MA (US)

( * ) Notice: Subject to any disclaimer, the term of this patent is extended or adjusted under 35 U.S.C. 154(b) by 358 days.

This patent is subject to a terminal disclaimer.

(21) Appl. No.: 10/534,932

(22) PCT Filed: Oct. 23, 2003

(86) PCT No.: PCT/US03/33998

§ 371 (c)(1),
(2), (4) Date: May 13, 2005

(87) PCT Pub. No.: WO2004/038157

PCT Pub. Date: May 6, 2004

(65) Prior Publication Data

US 2006/0051553 A1    Mar. 9, 2006

Related U.S. Application Data

(63) Continuation-in-part of application No. 10/278,720, filed on Oct. 23, 2002, now Pat. No. 6,974,512.

(51) Int. Cl.
*B32B 37/00* (2006.01)

(52) U.S. Cl. ........................ 156/72; 156/73.1; 156/259; 156/510; 156/580.1; 428/93

(58) Field of Classification Search .................... 156/72, 156/73.1, 73.2, 173, 259, 308.2, 510, 580.1, 156/580.2; 428/92, 93
See application file for complete search history.

(56) References Cited

U.S. PATENT DOCUMENTS

| | | |
|---|---|---|
| 2,108,450 A | 2/1938 | Schlegel |
| 2,214,157 A | 9/1940 | Bannister |
| 2,475,019 A | 7/1949 | Faris |
| 2,504,144 A | 4/1950 | Morris |
| 3,082,141 A | 3/1963 | Steele et al. |
| 3,175,256 A | 3/1965 | Horton |
| 3,224,047 A | 12/1965 | Horton |
| 3,266,190 A | 8/1966 | Jackson |

(Continued)

FOREIGN PATENT DOCUMENTS

EP    0395485 A1    10/1990

(Continued)

*Primary Examiner*—James Sells
(74) *Attorney, Agent, or Firm*—Goodwin Procter LLP

(57) ABSTRACT

Pile weatherstripping (20) having an integral fin is made by wrapping a fin material around a traveling mandrel or band (14), winding pile material around the fin material and the band (14), attaching a pair of backer elements to the pile material along opposite edges of the band, and then cutting the fin material and the pile material to produce simultaneously two pile weatherstrips. Stationary and traveling elements may be employed to facilitate cutting and produce fin above the pile weatherstrips (20).

27 Claims, 12 Drawing Sheets

U.S. PATENT DOCUMENTS

| | | |
|---|---|---|
| 3,311,960 A | 4/1967 | Kessler |
| 3,312,250 A | 4/1967 | Sirignano et al. |
| 3,527,631 A | 9/1970 | Ryburn |
| 3,554,851 A | 1/1971 | Modigliani |
| 3,677,851 A | 7/1972 | Kayser |
| 3,690,038 A | 9/1972 | Dieterich |
| 3,745,053 A | 7/1973 | Johnson et al. |
| 3,819,444 A | 6/1974 | Ungerer |
| 3,836,421 A | 9/1974 | Terry, Jr. et al. |
| 4,024,004 A | 5/1977 | Metzler |
| 4,148,953 A | 4/1979 | Horton |
| 4,214,930 A | 7/1980 | Burrous |
| 4,302,494 A | 11/1981 | Horton |
| 4,313,990 A | 2/1982 | Franklin et al. |
| 4,458,450 A | 7/1984 | Young et al. |
| 4,588,463 A | 5/1986 | Barber et al. |
| 4,637,948 A | 1/1987 | Evans et al. |
| 4,699,818 A | 10/1987 | Evans et al. |
| 4,849,270 A | 7/1989 | Evans et al. |
| 5,096,181 A | 3/1992 | Menon et al. |
| 5,160,187 A | 11/1992 | Drumm |
| 5,338,382 A | 8/1994 | Johnson et al. |
| 5,438,802 A | 8/1995 | Johnson |
| 5,470,629 A | 11/1995 | Mokhtar et al. |
| 5,807,451 A | 9/1998 | Johnson |
| 5,817,390 A | 10/1998 | Johnson |
| 6,711,858 B1 | 3/2004 | Albanese et al. |
| 6,974,512 B2 | 12/2005 | Henry et al. |
| 2004/0076790 A1 | 4/2004 | Wylie et al. |

FOREIGN PATENT DOCUMENTS

| | | |
|---|---|---|
| FR | 2 392 297 | 12/1978 |
| WO | WO 02/20932 | 3/2002 |
| WO | WO 03/100151 | 12/2003 |
| WO | WO 2004/035898 | 4/2004 |
| WO | WO 2004/042248 | 5/2004 |

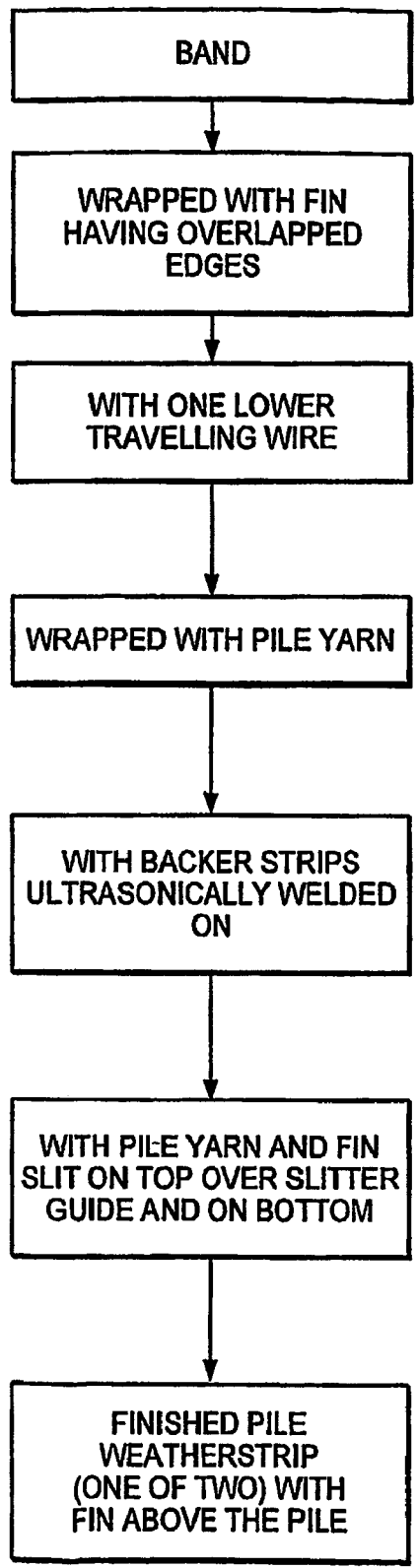
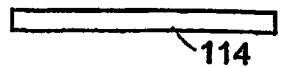
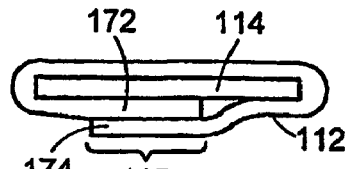
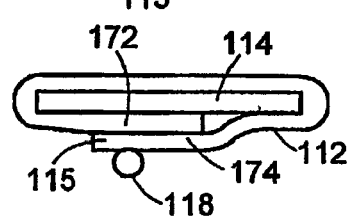
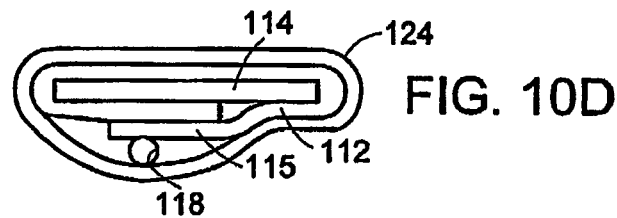
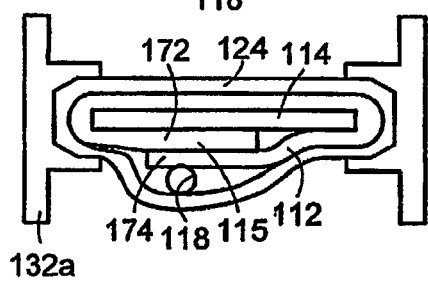
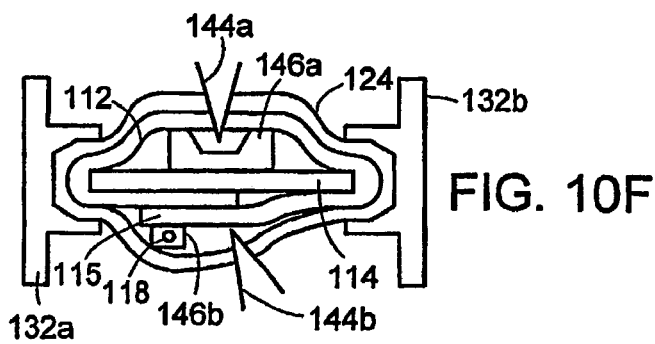
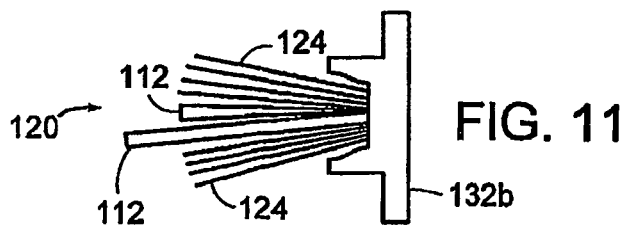

PILE WEATHERSTRIPPING MANUFACTURING APPARATUS AND METHOD

CROSS-REFERENCE TO RELATED APPLICATIONS

This application is a national stage application of International Application No. PCT/US03/33998, filed Oct. 23, 2003, entitled "Pile Weatherstripping Manufacturing Apparatus and Method," which is a continuation-in-part of U.S. application Ser. No. 10/278,720, filed Oct. 23, 2002, entitled "Pile Weatherstripping Manufacturing Apparatus and Method," now U.S. Pat. No. 6,974,512.

FIELD OF THE INVENTION

The present invention relates generally to the manufacture of pile weatherstripping and, more specifically, to apparatus for and methods of manufacturing pile weatherstripping having an integral fin.

BACKGROUND OF THE INVENTION

Pile weatherstripping is in widespread use in both the automotive and building products industries. Weatherstrip of this type originally was made by forming strips of pile on a backing sheet, either by weaving or by flocking, then applying a resin on the reverse side of the backing sheet, and then slitting the backing sheet between the strips of pile. The resin was typically applied in liquid form, and cooled or cured before the slitting step. If desired, supplemental material, such as fins, may be included and ultrasonically welded in place to form combination weatherstrips.

Advancements in the art resulted in making pile type weatherstripping without first weaving a pile fabric, without flocking, and without the application of a liquid resin. Briefly, yarn that forms the pile is wound on a traveling mandrel or band and is welded while still on the mandrel to backing strips, typically two in number, aligned on opposite sides of the mandrel. The yarn is then parted at locations interdisposed between the backing strips to form two continuous pile weatherstrips. If desired, supplemental material, such as fins, may be included and welded in place simultaneously with the backing strips to form combination weatherstrips. See, for example, U.S. Pat. No. 3,677,851 to Kayser, U.S. Pat. No. 4,148,953 to Horton, U.S. Pat. No. 4,302,494 to Horton, U.S. Pat. No. 5,338,382 to Johnson et al., U.S. Pat. No. 5,807,451 to Johnson, and U.S. Pat. No. 5,817,390 to Johnson, the disclosures of which are incorporated by reference herein in their entirety.

The commercial market for integral fin pile weatherstripping generally desires that the fin extend above the cut pile. Therefore, there exists a need in the art to produce fin above the pile weatherstripping in a continuous, efficient, high yield process, without having to undertake additional steps, such as coining the fin material in an attempt to control registration of the fin material on the band and, ultimately, height of the fin relative to the cut pile.

SUMMARY OF THE INVENTION

According to one aspect, the invention concerns a method of continuously manufacturing a pile weatherstrip having an integral fin. The method includes the steps of wrapping a fin material around a traveling band so as to provide excess fin material proximate at least one side of the band. Thereafter, the method includes winding a pile material around the fin material and the band, attaching a backer to the pile material, and cutting the fin material and the pile material to produce the pile weatherstrip.

In one embodiment, the wrapping step includes wrapping the fin material at least partially around the traveling band and spaced from the band at at least one location using a stationary element. The stationary element can be at least one wire, generally aligned with a centerline of the band. In another embodiment, the wrapping step includes wrapping the fin material longitudinally around the traveling band such that the respective edges of the fin material overlap. The method can further entail spacing the pile material from the band at at least one location prior to cutting the pile material. This spacing may occur initially at the winding step. In certain embodiments, the pile material is spaced from the band using a traveling element, such as at least one wire. In a particular embodiment, the traveling element is three wires, wherein two wires are disposed proximate a first side of the band and one wire is disposed proximate a second side of the band. In this embodiment, the fin material is disposed between the two wires and the band. Spacing between the two wires may converge in a downstream direction, from the winding step to the cutting step. The one wire disposed proximate the second side of the band can be offset from the centerline of the band.

In one embodiment, the step of attaching the backer can employ ultrasonic welding. If desired, the backer can be separate first and second backer elements, such that two integral fin pile weatherstrips result when the fin material and the pile material are cut. The method may include the step of employing a second stationary element, disposed between the fin material and the band, to facilitate the cutting step.

According to other aspects, the invention is also drawn to a pile weatherstrip having an integral fin manufactured in accordance with the foregoing methods, as well as a machine for manufacturing a pile weatherstrip having an integral fin. In general, the machine includes a traveling band and a guide for wrapping a fin material around the band so as to provide excess fin material proximate at least one side of the band. A winding station is provided for winding a pile material around the fin material and the band. Downstream thereof is an attachment station for attaching a backer to the pile material and a slitter station for cutting the fin material and the pile material to produce the pile weatherstrip.

In one embodiment, the wrapping guide wraps the fin material at least partially around the traveling band and spaced from the band at at least one location using a stationary element. The stationary element can be at least one wire that may be generally aligned with a centerline of the band. In another embodiment, the wrapping guide wraps the fin material longitudinally around the traveling band such that respective edges of the fin material overlap. The machine may also include a traveling element for spacing the pile material from the band at at least one location prior to cutting the pile material. In one embodiment, the pile material is spaced from the band at the winding station and the traveling element can be at least one wire. In a particular embodiment, the traveling element is three wires, wherein two wires are disposed proximate a first side of the band and one wire is disposed proximate a second side of the band. In this embodiment, the fin material is disposed between the two wires and the band and spacing between the two wires converges in a downstream direction, from the winding station to the slitter station. The one wire disposed proximate the second side of the band is offset from the centerline of the band.

The attachment station may be an ultrasonic welder. If desired, the backer can be first and second backer elements, such that two integral fin pile weatherstrips result when the fin material and the pile material are cut. A second stationary element may be disposed between the fin material and the band to facilitate cutting the fin material and the pile material at the slitter station.

BRIEF DESCRIPTION OF THE DRAWINGS

The invention, in accordance with preferred and exemplary embodiments, together with further advantages thereof, is more particularly described in the following detailed description, taken in conjunction with the accompanying drawings, in which:

FIG. 9 is a flowchart of the process steps in accordance with another method of the invention;

FIGS. 10A-10F are schematic cross-sectional views of the band at various stations on the machine showing these stages of manufacture of the pile weatherstrip;

FIG. 11 is a schematic cross-sectional view of a fin above the pile weatherstrip manufactured in accordance with this embodiment of the invention;

DETAILED DESCRIPTION

The presently preferred and alternative embodiments of the invention, including the best mode for practicing the invention known to the inventors at this time, are now described in detail in connection with the accompanying drawings.

Figure 1A:
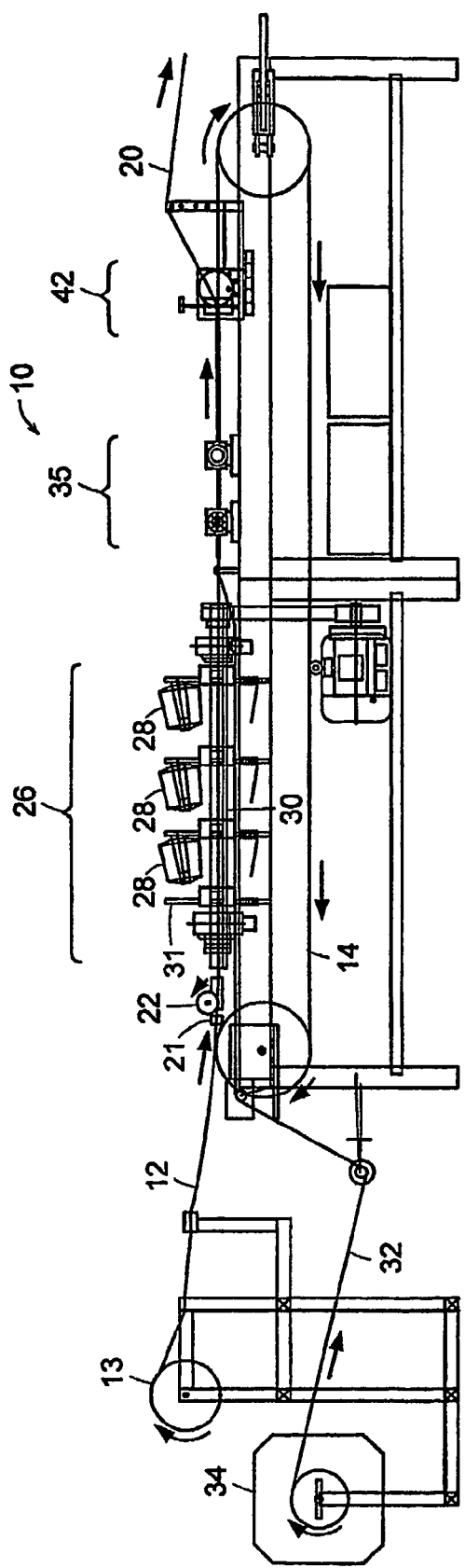
FIG. 1A is a schematic side view of one embodiment of a machine for manufacturing a pile weatherstrip having an integral fin in accordance with the invention.
Figure 1B:
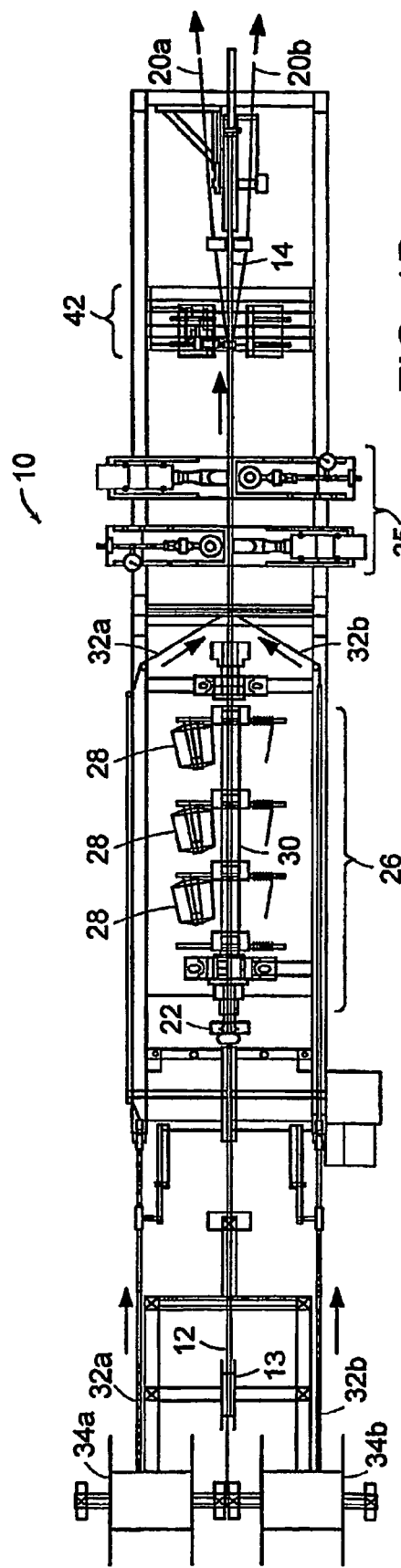
FIG. 1B is a schematic plan view of the machine of FIG. 1A.
Figure 2A:
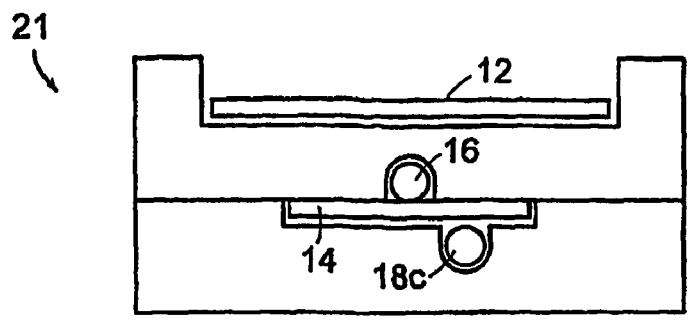
FIG. 2A is a schematic front view of an alignment block, including a portion of the stationary element, disposed upstream of the fin wrapping guide in accordance with one embodiment of the invention.
Figure 2B:
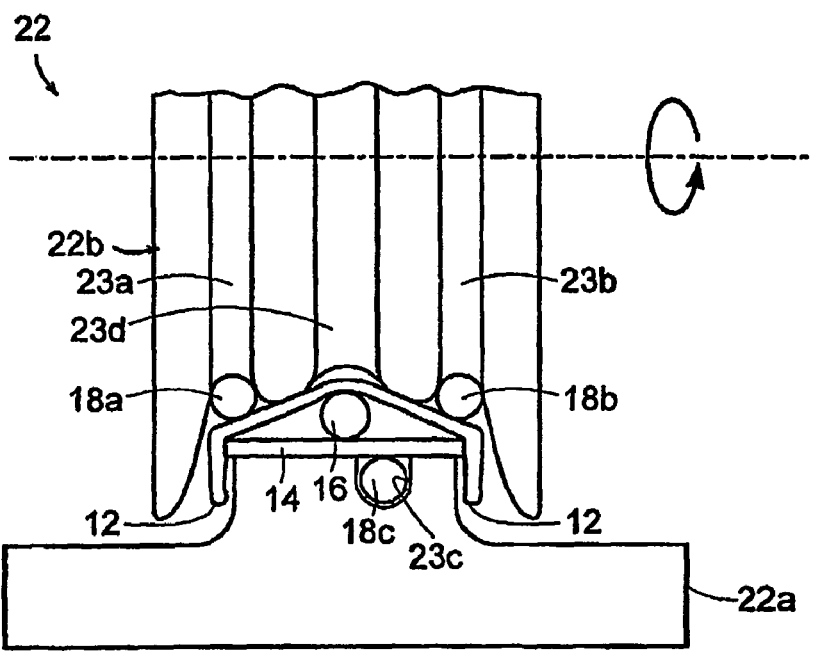
FIG. 2B is a schematic front view, downstream of FIG. 2A, of the fin wrapping guide and the stationary element in accordance with one embodiment of the invention.
Figure 2C:
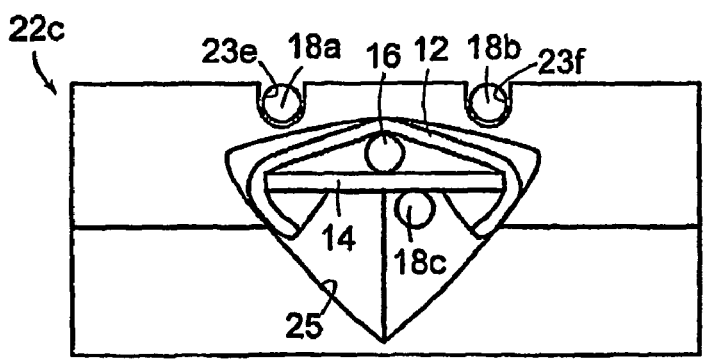
FIG. 2C is a schematic front view, downstream of FIG. 2B, of the fin wrapping guide and the stationary element in accordance with one embodiment of the invention.
Figure 6:
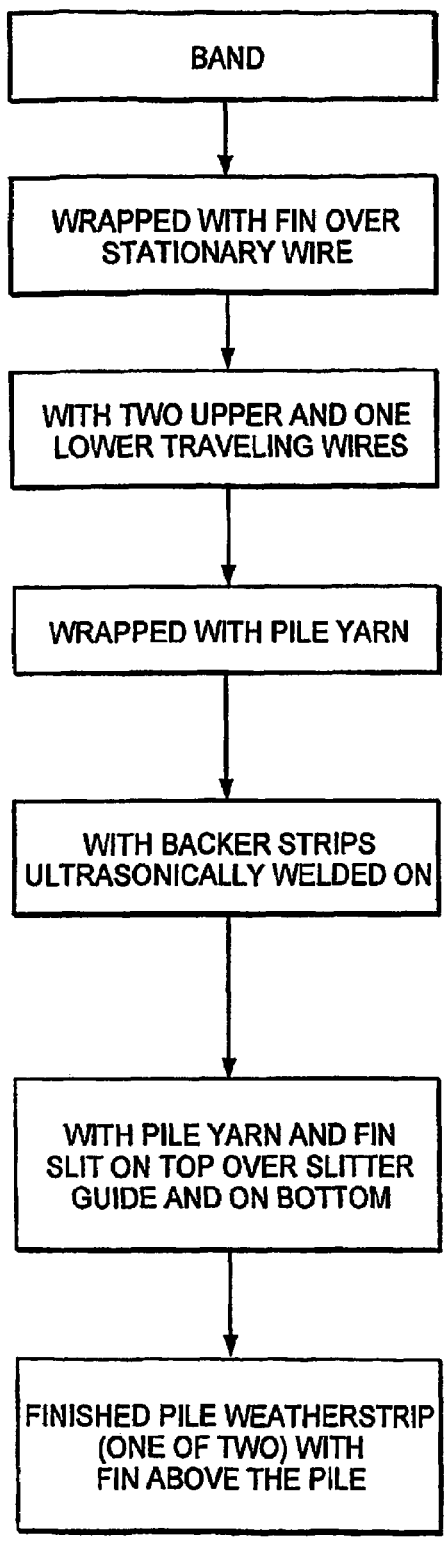
FIG. 6 is a flowchart of the process steps in accordance with one method of the invention.

Briefly, FIGS. 1A-1B are schematic side and plan views of one embodiment of a machine 10 for manufacturing a pile weatherstrip having an integral fin in accordance with the invention. In accordance with the flowchart of FIG. 6, one method of the invention begins with the wrapping of a fin material 12 at least partially around a continuous or endless, traveling mandrel or band 14 using a wrapping guide 22, as best seen in FIGS. 2B-2C. See also FIGS. 7A-7F, which are schematic cross-sectional views of the band 14 at various stations on the machine showing the stages of manufacture of the fin above the pile weatherstrip 20 depicted in FIG. 8. Note that the fin material 12 is shown as being relatively thick, to facilitate depiction of the manufacturing method. In reality, the fin material 12 can be relatively thin, for example, on the order of about 0.003 inches to about 0.012 inches in thickness.

In one embodiment, as shown in FIGS. 1A-1B, the fin material 12 is drawn from a spool 13 and is spaced from the band 14 at least one location using a stationary element 16, such as a wire. See FIG. 7B. The stationary element 16 is generally aligned with a centerline of the band 14 and may be anchored in an alignment block 21, that generally aligns and centers the fin material 12 vertically over the band 14. See FIG. 2A. The stationary element 16, alternatively, may be formed integrally with the alignment block 21. The stationary element 16 causes excess fin material 12 to be disposed on one side of the band 14, the excess fin material 12 ultimately extending above the pile material once both are cut to form the finished weatherstrip 20, as depicted in FIG. 2B. Depending on the size of the stationary element 16, the excess fin material 12 in the finished weatherstrip 20 can extend above the pile material from about 0.001 inches to about 0.1 inches, or more. In general, the commercial market desires that the excess fin material 12 in the finished weatherstrip 20 extend above the pile material from about 0.01 inches to about 0.02 inches.

The fin material 12 is wrapped around the band 14 by any suitable structure. For example, as depicted in FIG. 2B, the wrapping guide 22 may include a stationary skid plate 22a, that supports the traveling band 14, and a rotating grooved roller 22b that, in combination, form a nip for passage therethrough of the band 14 and fin material 12. This portion of the wrapping guide 22 directs the edges of the fin material 12 downward, along the edges of the band 14. As depicted in FIG. 2C, another portion of the wrapping guide 22, directly downstream, completes wrapping of the fin material 12 on the band 14, by passing the fin material 12, the band 14, the stationary element 16, and a lower traveling wire 18c through a two piece split block 22c. A converging, tapered tunnel 25, having a generally inverted triangular shape, that is formed in the split block 22c wraps the edges of the fin material 12 up against a bottom surface of the band 14.

Figure 7A:
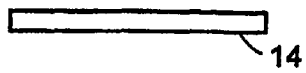
FIGS. 7A-7F are schematic cross-sectional views of the band at various stations on the machine showing the stages of manufacture of the pile weatherstrip.
Figure 7B:
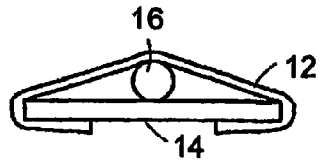
Figure 7C:
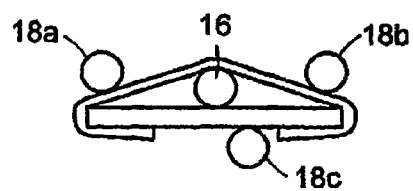
Figure 8:
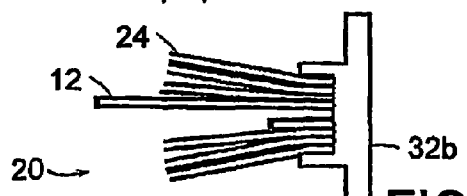
FIG. 8 is a schematic cross-sectional view of a fin above the pile weatherstrip manufactured in accordance with one embodiment of the invention.

As the fin material 12 is wrapped around and spaced from the band 14, a traveling element 18 is biased against the band 14. In one embodiment, the traveling element 18 includes three continuous wires 18a, 18b, and 18c that travel with the band 14. As best seen in FIGS. 2B, 2C, and 7C, two wires 18a, 18b are disposed proximate a first side of the band 14, initially near the edges thereof, on the same side as the excess fin material 12 and stationary element 16. Two circumferential grooves 23a, 23b formed in the roller 22b maintain the two wires 18a, 18b in proper alignment and registration with the band 14. The third, lower traveling wire 18c is disposed proximate a second side of the band 14 and is offset from the centerline of the band 14. A linear groove 23c formed in the skid plate 22a maintains the wire 18c in proper alignment and registration with the band 14. Another circumferential groove 23d is provided in the roller 22b to provide clearance for the stationary element 16. Downstream, a pair of grooves 23e, 23f formed in the top of the split block 22c finally position the two wires 18a, 18b relative to the band 14 prior to passage of the band 14 through a winding station 26. See FIGS. 1A-1B.

Figure 7D:
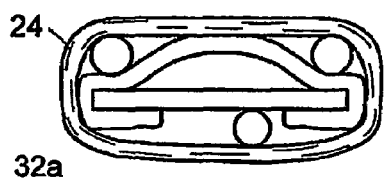
Figure 7E:
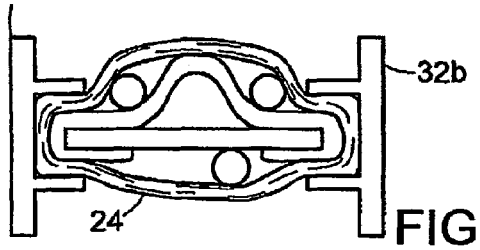
Figure 7F:
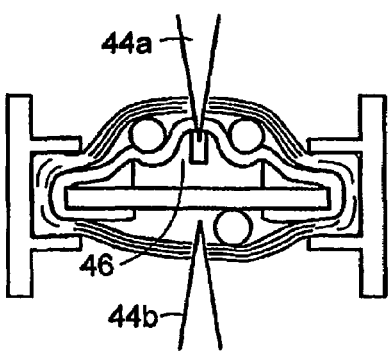

As depicted in FIGS. 7D-7F, the traveling element 18 is used, at least in part, for spacing pile material 24 from the band at at least one location prior to cutting the pile material 24. With the traveling element 18 in place, the band 14 passes through the winding station 26 where the pile material 24 is wrapped around the fin material 12 and the band 14. With reference to FIGS. 1A-1B, the pile material 24 may be in the form of yarn and is drawn from a plurality of cones 28 carried by a revolving spindle 30. In one embodiment, twelve yarn cones 28 are used. The yarn passes through guide apertures in at least one disk 31, that is also fixed to the spindle 30. In one embodiment, additional guide apertures can be provided in disks supporting the cones 28 to provide tension in the yarn strands. As shown, the band 14 may be simply a flat strip of metal or other suitable material, half of the width of which determines the height of the pile of the finished weatherstrip 20. To facilitate manufacture of a uniform pile weatherstrip, it may be desirable to knurl or otherwise roughen slightly the edges of the band 14 so that the pile material 24 wrapped thereon stays in place until attached to a backer 32.

As shown in FIGS. 1A-1B, and specifically FIG. 7D, at the winding station 26, the band 14 passes axially through the rotating spindle 30 and receives the pile yarn in a continuous helical wrap. The rotational speed of the spindle 30, the travel speed of the band 14, and the number and type of yarn cones 28 determine the density of the pile in the finished weatherstrip 20. The stationary element 16 terminates at a point just downstream of where the pile material 24 is wrapped around the band 14.

Figure 3:
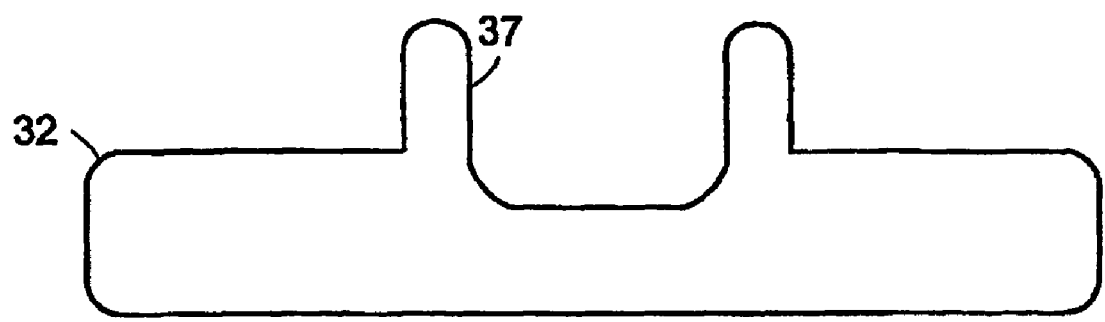
FIG. 3 is a schematic cross-sectional view of a backer element in accordance with one embodiment of the invention.

Downstream of the winding station 26, a backer 32 is then mated with an edge of the band 14 at an attachment station 35. As best seen in FIG. 3, the backer 32 includes a groove 37 to receive the edge of the band 14. The backer 32 can be formed by extrusion or any other suitable manufacturing process. In one embodiment, the backer 32 includes separate first and second backer elements 32a, 32b mated to opposite edges of the band 14, such that two integral fin pile weatherstrips result when the fin material 12 and the pile material 24 are cut.

As seen in FIG. 1B, the backer elements 32a, 32b are unreeled from respective spools 34a, 34b and biased into contact with the pile material 24 by suitable guides, such as rotatable disks 33a, 33b, along opposite edges of the band 14 synchronously with the travel of the band 14. See FIGS. 4 and 7E. The backer elements 32a, 32b are then permanently attached to the pile material 24 at the attachment station 35, for example by being welded to the pile material 24 using an ultrasonic welder 36. Insofar as the backer elements 32a, 32b are on opposite edges of the band 14, two ultrasonic welders 36a, 36b can be used.

Respective anvils 38a, 38b may be mounted in opposition to the ultrasonic welders 36a, 36b to support the band 14, prevent deflection thereof under the force applied by the ultrasonic welders 36a, 36b, and maintain the backer elements 32a, 32b in close contact with respective welders 36a, 36b. To minimize friction and resultant drag on the backer elements 32a, 32b, the anvils 38a, 38b can be bearing mounted rotatable disks, having a suitable circumferential contour to mate with the outer surfaces of the backer elements 32a, 32b.

Figure 4:
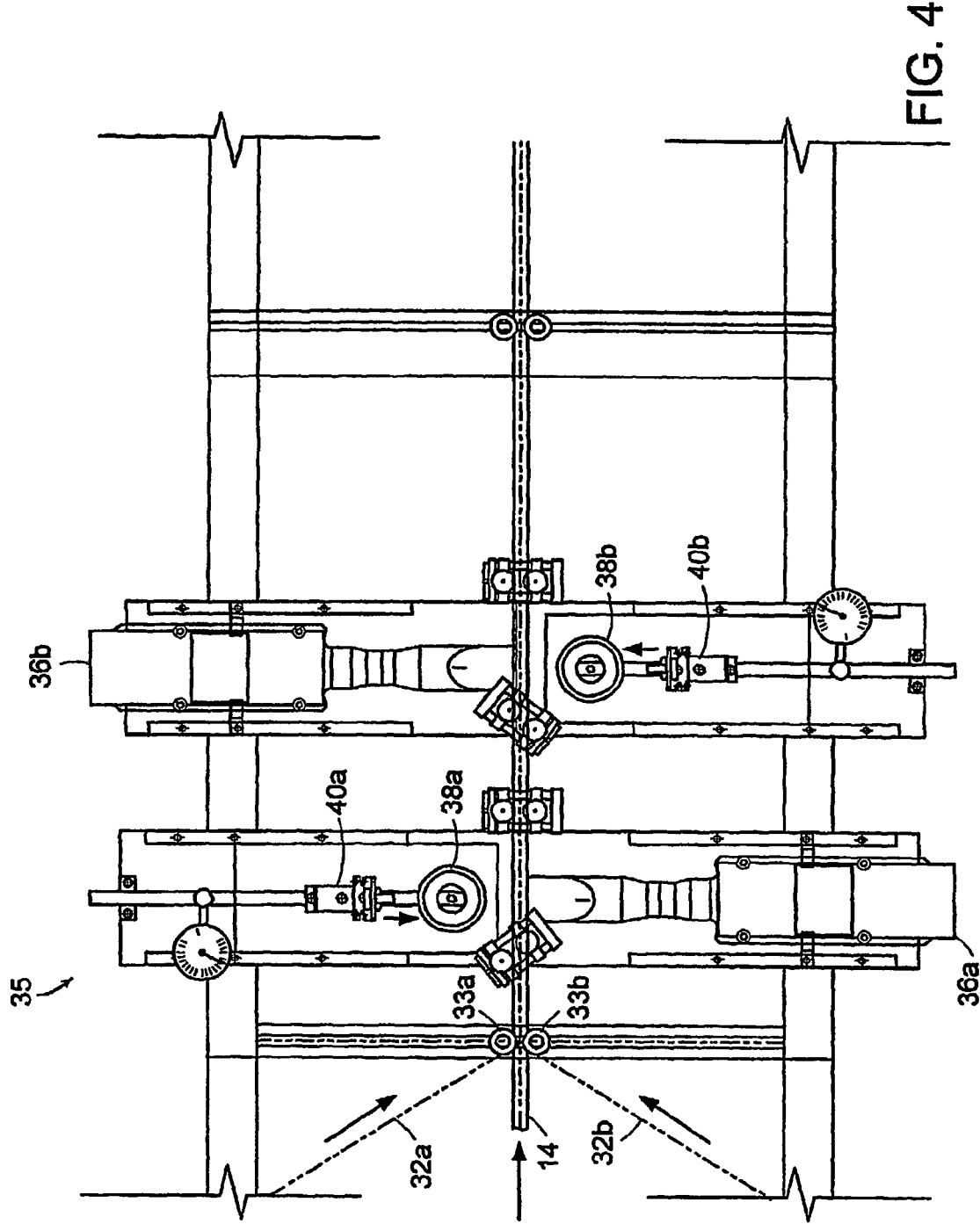
FIG. 4 is a schematic plan view of the backer attachment station in accordance with one embodiment of the invention.
Figure 16A:
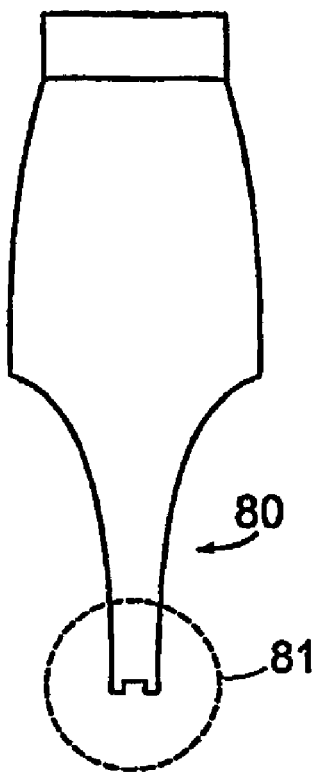
FIG. 16A is a schematic side view of an ultrasonic welding horn in accordance with one embodiment of the invention.
Figure 16B:
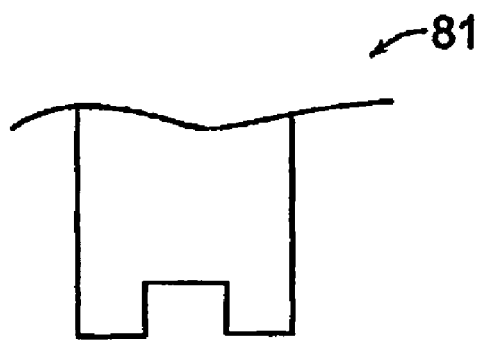
FIG. 16B is an enlarged schematic side view of a tip of the ultrasonic welding horn of FIG. 16A.

The anvils 38a, 38b may be biased into contact with the backer elements 32a, 32b by any suitable means, such as pneumatic pistons 40a, 40b, the pressure in which may be regulated to provide appropriate force. In welding, it is generally desirable to apply enough energy to impart a set to the pile material 24, conforming the pile material 24 to the shape of the band 14 and grooves 37 formed in each backer 32, so that in the finished weatherstrip 20, the pile material 24 extends generally perpendicular to the backer 32 and does not tend to splay outwardly excessively or lie too flat. As depicted in FIGS. 1B and 4, the pistons 40a, 40b are shown in an unpressurized state, such that the anvils 38a, 38b are retracted from each backer 32 and the band 14. In operation, during welding, the anvils 38a, 38b are biased against each backer 32 and pressure in the pistons 40a, 40b can be independently set. Conventional wear resistant layers, such as carbide, or surface treatments, such as Plasmatech plasma spray coatings (Plasmatech, S. Windsor, Conn.) can be applied to the tips of the ultrasonic welder horns to increase horn life. Further, each ultrasonic welding horn 80, as shown in FIGS. 16A and 16B, can have a groove with a shape and size that corresponds to the backing material 32. Shaping and sizing the tip 81 of the welding horn 80 to correspond to that of the backing material 32 provides positive tracking of the backing material 32 and intimate contact between the horn tip 81, backing material 32, fin material 12, pile material 24, and band 14, thereby improving the welds produced. Air coolers can also be provided to prevent overheating of the ultrasonic welders 36a, 36b.

Following attachment of the backer 32, the pile material 24 and the fin material 12 are parted at points between the backer elements 32a, 32b at a slitter station 42 having a pair of circular cutting wheels 44a, 44b, and the resulting weatherstrips 20a, 20b are delivered to downstream take-up spools or otherwise packaged. A puller may be employed to maintain tension on the weatherstrips 20a, 20b as they are produced.

Figure 5:
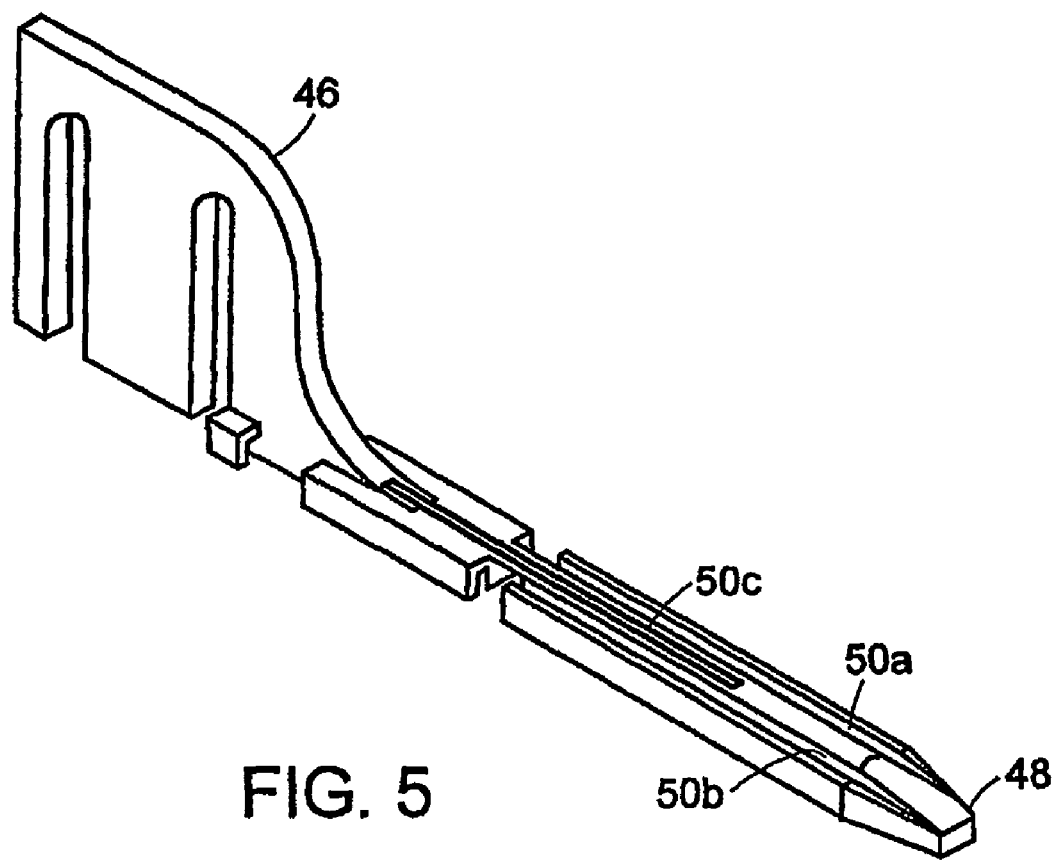
FIG. 5 is a schematic perspective side view of the second stationary element in accordance with one embodiment of the invention.

At the slitter station 42, a second stationary element, such as a slitter guide 46 depicted in FIGS. 5 and 7F, may be employed to facilitate cutting of the fin material 12 and the pile material 24. The slitter guide 46 is disposed proximate the band 14 and has a tapered leading edge 48 that rides under the fin material 12. Two longitudinal grooves 50a, 50b are formed in the slitter guide 46 along the edges thereof, through which the two upper traveling wires 18a, 18b pass, with the excess fin material 12 disposed therebetween. The grooves 50a, 50b are initially open at the top and then at the bottom to capture positively the two wires 18a, 18b. A third centrally disposed longitudinal clearance groove 50c is provided, in which the periphery of the upper cutting wheel 44a passes, to cut simultaneously both the fin material 12 and the pile material 24. In this way, both the fin material 12 and the pile material 24 are cut, without the cutting wheels 44a, 44b contacting the band 14. Also, the two upper wires 18a, 18b converge in the downstream direction, being relatively widely spaced by the split block 22c, just prior to entering the winding station 26, and relatively closely spaced by the slitter guide 46, at the slitter station 42. In this manner, the excess fin material 14 is captured and maintained between the two wires 18a, 18b, so that it rides up smoothly over the slitter guide 46 and is cut in the center, yielding two substantially dimensionally equivalent weatherstrips 20a, 20b. See FIG. 1B.

Figure 12A:
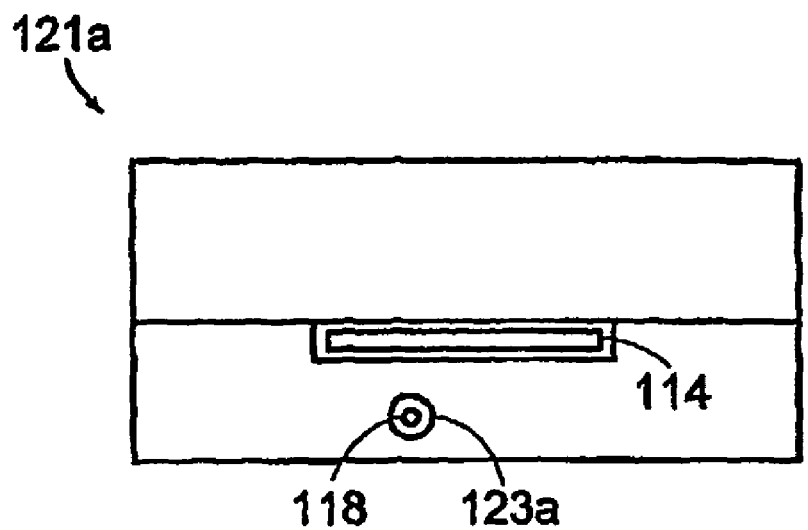
FIG. 12A is a schematic front view of a first alignment block disposed upstream of the fin wrapping guide in accordance with one embodiment of the invention.
Figure 12B:
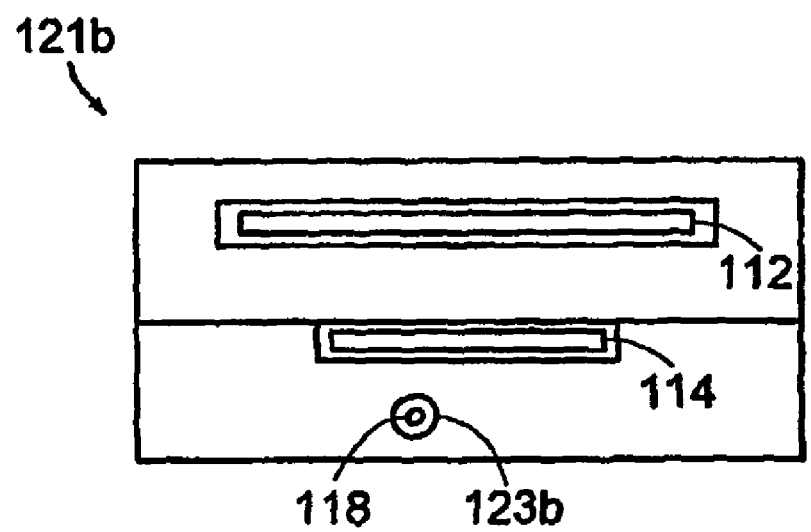
FIG. 12B is a schematic front view of a second alignment block disposed downstream of the first alignment block and upstream of the fin wrapping guide in accordance with one embodiment of the invention.
Figure 12C:
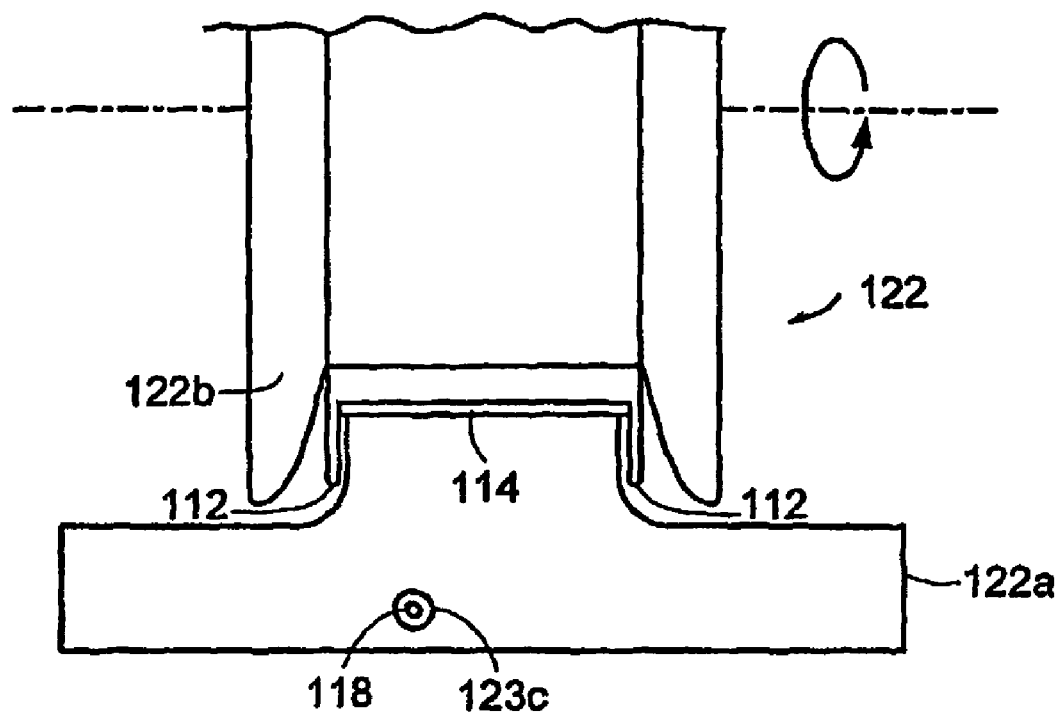
FIG. 12C is a schematic front view, downstream of FIG. 12B, of the fin wrapping guide in accordance with one embodiment of the invention.
Figure 12D:
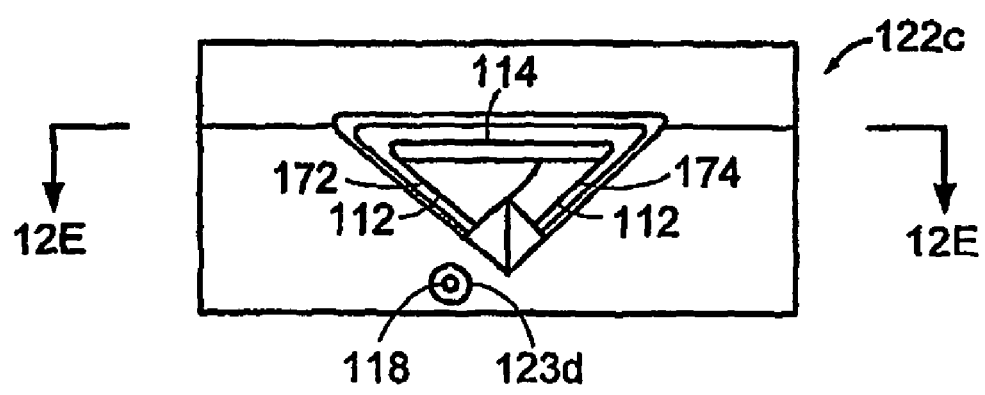
FIG. 12D is a schematic front view, downstream of FIG. 12C, of the fin wrapping guide in accordance with one embodiment of the invention.
Figure 12E:
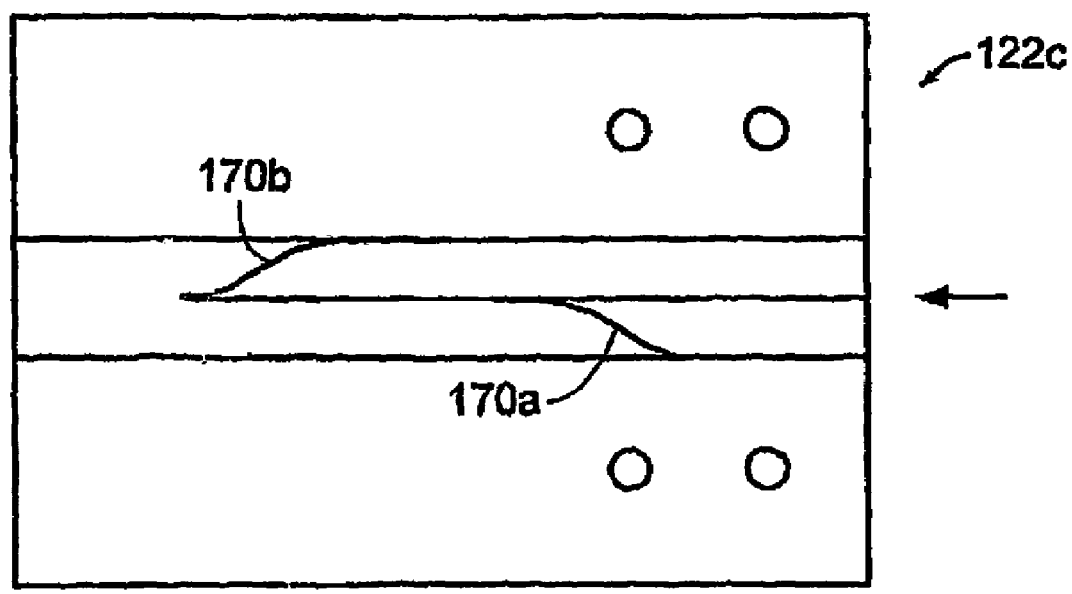
FIG. 12E is a schematic cross-sectional view of the fin wrapping guide of FIG. 12D taken about line 12E-12E of FIG. 12D.

In accordance with the flowchart of FIG. 9, another method of the invention begins with the wrapping of a fin material 112 around a continuous or endless traveling mandrel or band 114 using a wrapping guide 122, as best seen in FIGS. 12C-12E. See also FIGS. 10A-10F, which are schematic cross-sectional views of the band 114 at various stations on the machine showing the stages of manufacture of the fin above the pile weatherstrip 120 depicted in FIG. 11.

In this aspect of the invention, the band 114 may enter a first alignment block 121a (FIG. 12A) that confines the band's 114 location and direction of travel. Similarly, the fin material 112, which is drawn from a spool, may be anchored in a second alignment block (FIG. 12B) 121b that generally aligns and centers the fin material 112 vertically over the band 114. Both the first alignment block 121a and the second alignment block 121b include a linear aperture or groove 123a, 123b through which a travelling element 118 passes. The travelling element 118 may be a continuous wire that travels with the band 114 as described above. The travelling wire 118 is disposed beneath the band 114, and is offset from the centerline of the band 114 as it travels through the alignment blocks 121a, 121b. After the fin material 112 exits the second alignment block 121b, the fin material 112 is wrapped around the band 114, such that an overlap 115 of the fin material 112 is formed on the bottom side of the band 114. The overlap 115 causes excess fin material 112 to be disposed on the bottom side of the band 114, the excess fin material 112 ultimately extending above the pile material 124 once the finished weatherstrip 120 is formed, as depicted in FIG. 11. It should be understood that in accordance with the invention, the overlap 115 could be formed on the top side of the band as well.

The fin material 112 is wrapped around the band 114 by any suitable structure. For example, as depicted in FIG. 12C, the wrapping guide 122 may include a stationary skid plate 122a, that supports the traveling band 114, and a rotating roller 122b that, in combination, form a nip for passage therethrough of the band 114 and fin material 112. This portion of the wrapping guide 122 directs the edges of the fin material 112 downward, along the edges of the band 114. Also included in the wrapping guide 122 is a linear groove 123c formed in the skid plate 122a that maintains the wire 118 in proper alignment and registration with the to-be-formed overlap region 115 of the fin material 112. In the illustrated embodiment, the channel 123c is located on the lower side of the band 114, and is offset from the centerline of the band 114. In other embodiments, the groove 123c can be in different locations in the skid plate 122a depending on the location of the overlap 115.

As depicted in FIGS. 12D-12E, another portion of the wrapping guide 122, directly downstream, completes wrapping of the fin material 112 on the band 114, by passing the fin material 112 and the band 114 through a two piece split block 122c that generally has the shape of an inverted triangular converging tunnel. As the fin material 112 passes through the split block 122c, a first tapered portion 170a that is formed in the split block 122c wraps a first edge 172 of the fin material 112 up against the bottom surface of the band 114. After the first edge 172 is wrapped against the band 114, a second tapered portion 170b formed in the split block 122c overlaps the second edge 174 over the first edge 172 (FIG. 10B). Also included in the wrapping guide 122 is a linear groove 123d formed in the split block 122c that maintains the wire 118 in proper alignment and registration with the overlap region 115 of the fin material 112.

As shown in FIG. 10C, once the fin material 112 has been wrapped around the band 114, the traveling element 118 is biased against the fin 112 in the region of the overlap 115. Generally, the traveling element 118 aids in maintaining the overlap 115 of the fin material 112 on the band 114. With the traveling element 118 pressed against the overlap region 115, the band 114 passes through the winding station 126 where the pile material 124 is wrapped around the fin material 112 and the band 114 as described in earlier embodiments. As depicted in FIGS. 10D-10F, the traveling element 118 is used, at least in part, for spacing pile material 124 from the overlap 115 prior to cutting the pile material 124.

Figure 13:
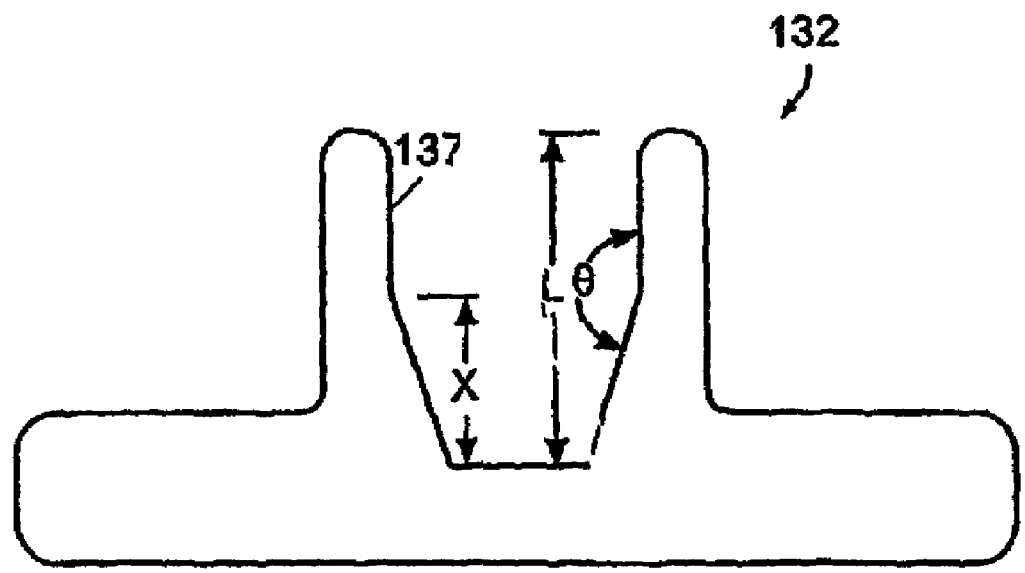
FIG. 13 is a schematic cross-sectional view of a backer element in accordance with another embodiment of the invention.

Downstream of the winding station 126, a backer 132 is mated with an edge of the band 114 at an attachment station 135 as previously described. As best seen in FIG. 13, the backer 132 includes a groove 137 to receive the edge of the band 114, the groove 137 having a depth (L). The groove 137 includes an opening having a first length (L-X) that is generally parallel to the longitudinal sides of the band 114. A second length (X) is tapered, so that when the band 114, pile material 124, and fin material 112 are inserted into the backer 132, they are pressed together in intimate contact. Generally, the ratio of X:L is approximately 50%. In other embodiments, the ratio of X:L can range between about 30% to about 70%, or between about 10% to about 90%. The angle between the first length (L-X) and the second length (X) is represented by the angle ($\theta$). The angle ($\theta$) is generally approximately 165 degrees. However, in various embodiments, the angle ($\theta$) can range between about 150 degrees to about 175 degrees, or between about 135 degrees to less than about 180 degrees. Pressing the band 114, the pile material 124, and the fin material 112 against the backing element 132 through the use of a taper increases the weld quality and bond strength between the backing element 132, the fin material 112 and the pile material 124 achieved in the ultrasonic welding process previously described.

Figure 14A:
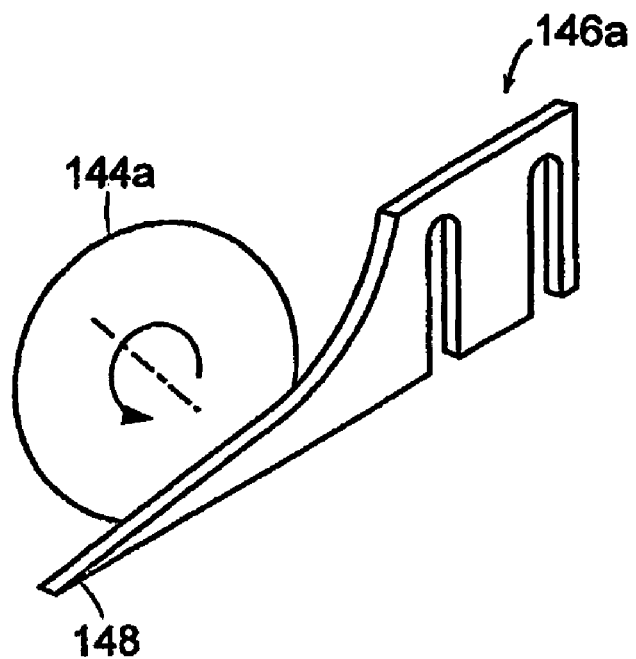
FIG. 14A is a schematic perspective side view of a first slitter guide in accordance with one embodiment of the invention.
Figure 14B:
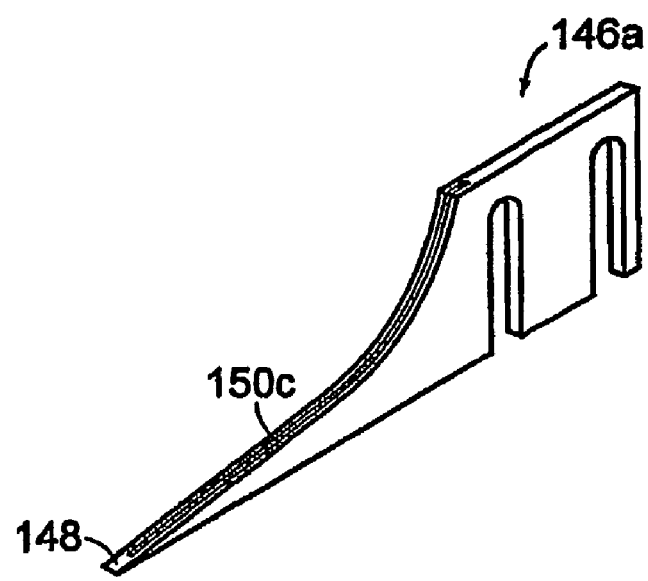
FIG. 14B is a schematic perspective side view of a first slitter guide in accordance with another embodiment of the invention.

Following attachment of the backer 132, the pile material 124 and the fin material 112 are parted at a point between the backer elements 132a, 132b at a slitter station 142. At the slitter station 142, a stationary element, such as a slitter guide 146a as depicted in various embodiments in FIGS. 14A-14B and 10F, may be employed to facilitate cutting of the fin material 112 and the pile material 124. The slitter guide 146 is disposed proximate the band 114 and has a tapered leading edge 148 that rides under the fin material 112. In one embodiment, the upper cutting wheel 144a cuts through the pile material 124 and the fin material 112 just off to the side of the slitter guide (FIG. 14A). In another embodiment, a centrally disposed longitudinal clearance groove 150c is provided in the slitter guide 146a, in which the periphery of the upper cutting wheel 144a passes, to cut simultaneously both the fin material 112 and the pile material 124 (FIG. 14B). In this way, both the fin material 112 and the pile material 124 are cut, without the cutting wheel 144a contacting the band 114.

Figure 15A:
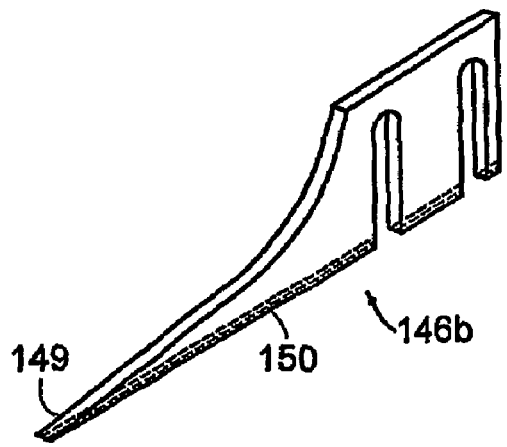
FIG. 15A is a schematic perspective side view of a second slitter guide in accordance with one embodiment of the invention.
Figure 15B:
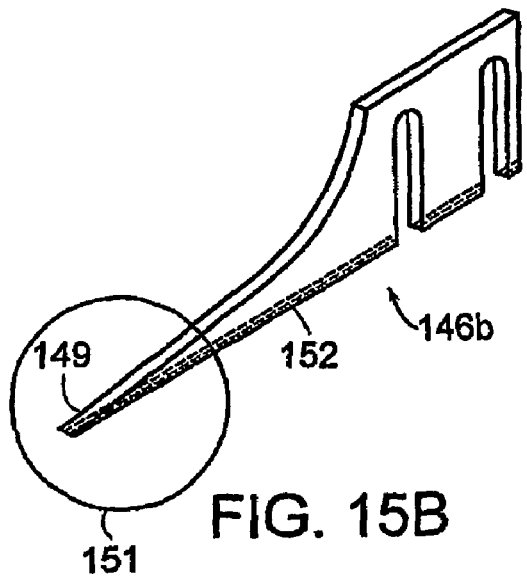
FIG. 15B is a schematic perspective side view of a second slitter guide in accordance with another embodiment of the invention.
Figure 15C:
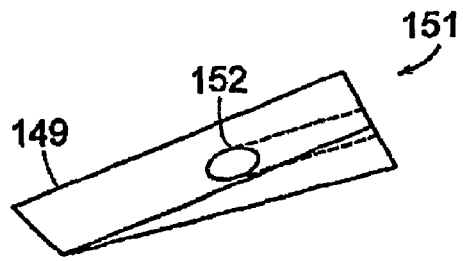
FIG. 15C is an enlarged schematic perspective side view of a portion of the second slitter guide of FIG. 15B.

Also at the slitter station 142, a second stationary element, such as a second slitter guide 146b depicted in FIGS. 15A-15C and 10F, may be used to facilitate cutting of the pile material 124. The second slitter guide 146b is disposed proximate the fin material 112 on the lower side of the band 114 at the location of the overlap 115. The second slitter guide 146b has a tapered leading edge 149 that rides above the fin material 112 and the band 114, but beneath the pile material 124. In one embodiment, a longitudinal groove 150 is formed along the center of the second slitter guide 146b along which the traveling wire 118 passes (FIG. 15A). In another embodiment, the traveling wire 118 passes through an aperture 152 in the second slitter guide 146b (FIGS. 15B-15C). A centrally disposed longitudinal clearance groove may also be provided in the second slitter guide 146b, in which the periphery of the lower cutting wheel 144b passes to cut the pile material 124. Alternatively, the lower cutting wheel 144b may slit the pile material 124 off to the side of the second slitter guide 146b. As depicted in FIG. 10F, the lower cutting wheel 144b cuts the pile material 124 in the region of the overlap 115 of the fin material 112.

With reference to FIG. 11, weatherstripping produced in accordance with this aspect of the invention is shown. As can be seen, the fin material 112 extends above the pile material 124 on the side of the band 114 that contained the overlap 115. On the side of the band 114 that did not have the overlap 115, the fin material 124 is approximately flush with the pile material 124.

The pile material 24 and the backer elements 32a, 32b are preferably of the same, or at least of compatible, polymers selected in view of the welding requirements. In some cases, polymers of different respective compositions can be welded together satisfactorily. Typical thermoplastic compositions for both the pile material 24 and the backer elements 32a, 32b include nylon, polyolefin, polyester, polyethylene, and polypropylene. Thermoplastic elastomers, which are a blend of a polymer resin and a natural or synthetic rubber, can also be used. The fin material 12 should also be made of a compatible polymer. In one embodiment, the pile material 24 and backer elements 32a, 32b are polypropylene, and the fin material 12 is be an embossed non-woven polypropylene fabric, adhered to a thin polypropylene film substrate. In various embodiments, suitable compositions for the pile material 24 and the backer elements 32a, 32b may be 12-melt yarn, Adsyl, Moplen, Polybutene-1, 1150 denier homo-polymer polypropylene, Hifax, Adflex, PP P4G4K-038, Hostacom, PMZ-080, Adstif, TP-1300-HC, Lupolex, PP-37-DC-01, 7823 Poly, P10-3045, SD-613, HNZ-020, P9HIA029X, 18507A, Valtec, Lupolen, 14S05A, Pro-fax, P6M2Z-080, PE LLD 03040, EFI natural yarn, and American yarn, including equivalents and blends, and various combinations and permutations thereof Suppliers for these materials include Basell Polyolefins Company N.V., Phillips Sumika Polypropylene Company, and Xamax Industries, Inc.

In any event, the fin material 12, the pile material 24, and the backer elements 32a, 32b are all welded in the single-pass welding steps depicted and described. With the inclusion of the fin material 12 in the construction, greater welding energy than would otherwise be required should be applied, to impart the desired set to the fin material 12, as well as to the pile material 24.

The invention also contemplates making a single weatherstrip by simply eliminating one of the backer elements 32a, 32b and parting the pile material 24 at a single point opposite from the remaining backing strip. The double backer arrangement depicted and described is beneficial, however, because of its greater efficiency. The practice of the invention enables a substantial reduction in cost relative to the heretofore conventional woven method of making fin above the pile weatherstripping. Forming the pile by winding is quicker and cheaper than weaving or flocking, and heavier gauge yarn, or even roving may be used. Welding of the backer elements is also advantageous in that it avoids the need to handle a liquid resin and a subsequent welding step to insert the fin material is not required. The practice of the invention also enables a substantial reduction in cost relative to the heretofore conventional method of making wound fin above the pile weatherstripping with a pair of separate coined fins. Forming the pair of pile weatherstrips by cutting the pile material and the fin material is less complex, less expensive, and more reliable than having to provide equipment to accurately coin and correctly register a pair of fins on the band.

The traveling band 14 is of generally uniform cross-sectional shape and size throughout its length, thus insuring that the pile material 24 is firmly positioned and properly tensioned for the welding operation. The only potential limitation on the speed of production appears at present to lie in the winding step. Centrifugal force limits the rotational speed of the spindle 30, but the supports for the yarn cones 28 can be made strong enough to sustain fairly high speed winding, and experience indicates that overall production time in the practice of the invention is significantly shorter than the time heretofore required to convert yarn and backing strips into woven pile weatherstripping. As with any high speed rotating spindle, care should be taken in the design of the machine frame to minimize vibratory resonances, for example by appropriate sizing of the mass of the frame or the addition of dampers.

The machine 10 further includes suitable motors, drive transmission components, sensors, and a controller to coordinate the operation of the machine 10, as will be apparent to those skilled in the art. The various stations of the machine 10, as well as guides and roller supports for the band between stations, may also be advantageously made adjustable in three orthogonal directions, to facilitate setup of the machine for various width bands, as well as to permit compensation for wear over time. System diagnostics, sensor-based fault detection, feedback control, and other troubleshooting tools consistent with robust production manufacturing systems may also be advantageously employed to ensure high quality process yields and minimal downtime. For instance, a detective yarn breakage system can be utilized where the yarn, thread, wire, or other material being wound is passed over a pivotable element with a flag at one end. In operation, the material maintains the flag in a retracted position. When the material breaks, the element pivots due to rotation of the spindle so that the flag flies outwardly to an extended position and breaks a photoelectric sensor beam.

While there have been described herein what are to be considered exemplary and preferred embodiments of the present invention, other modifications of the invention will become apparent to those skilled in the art from the teachings herein. All variants, modifications, and alternative embodiments that will occur to the skilled person are considered to be within the scope of the invention. For example, the fin material could be wound on the band helically and cut both above and below the band, as the pile material is cut. Additionally or alternatively, the first and second stationary elements can be any cross-sectional shape and can be multiple elements, such as two or more wires or leading edges. Also, the second stationary element grooves can be initially open at the bottom and then at the top, or only open at the bottom or the top, and respective lengths can vary. Further, the traveling element can be more or fewer than three wires. The lower traveling wire need not be offset from the centerline of the band and the first and second stationary elements need not be centered. Similarly, the cutting wheels need not be centered or aligned. All of these components may be arranged, as desired, to produce pile weatherstrips having nonuniform configurations, such as high pile along one side and low pile along the other. The two pile weatherstrips produced simultaneously also need not be substantially geometrically identical.

It is therefore desired to be secured in the appended claims all such modifications as fall within the true spirit and scope of the invention. Accordingly, what is desired to be secured by Letters Patent is the invention as defined and differentiated in the following claims, including all equivalents.

What is claimed is:

1. A method of continuously manufacturing a pile weatherstrip having an integral fin, the method comprising the steps of:
    wrapping a fin material longitudinally around a traveling band such that respective edges of the fin material overlap;
    winding a pile material around the fin material and the band;
    attaching a backer to the pile material; and
    cutting the fin material and the pile material to produce the pile weatherstrip.

2. The method of claim 1 further comprising the step of spacing the pile material from the band at at least one location prior to cutting the pile material.

3. The method of claim 2, wherein the pile material is spaced from the band at the winding step.

4. The method of claim 2, wherein the pile material is spaced from the band using a traveling element.

5. The method of claim 4, wherein the traveling element comprises at least one wire.

6. The method of claim 5, wherein the fin material is disposed between the one wire and the band.

7. The method of claim 5, wherein the one wire is offset from a centerline of the band.

8. The method of claim 1, wherein the attaching step comprises ultrasonic welding.

9. The method of claim 1, wherein the backer comprises a first backer element and a second backer element, such that two integral fin pile weatherstrips result when the fin material and the pile material are cut.

10. The method of claim 1 further comprising the step of employing a stationary element disposed between the fin material and the band to facilitate the cutting step.

11. A pile weatherstrip having an integral fin manufactured in accordance with the method of claim 1.

12. A machine for manufacturing a pile weatherstrip having an integral fin, the machine comprising:
    a traveling band;
    a guide for wrapping a fin material around the band so as to provide excess fin material proximate at least one side of the band;
    a winding station for winding a pile material around the fin material and the band, such that the excess fin material is relative to the pile material proximate the at least one side of the traveling band;
    an attachment station for attaching a backer to the pile material; and
    a slitter station for cutting the fin material and the pile material to produce the pile weatherstrip.

13. The machine of claim 12, wherein the wrapping guide wraps the fin material at least partially around the traveling band and spaced from the band at at least one location using a stationary element.

14. The machine of claim 13, wherein the stationary element comprises at least one wire.

15. The machine of claim 13, wherein the stationary element is generally aligned with a centerline of the band.

16. The machine of claim 12, wherein the wrapping guide wraps the fin material longitudinally around the traveling band such that respective edges of the fin material overlap.

17. The machine of claim 12 further comprising a traveling element for spacing the pile material from the band at at least one location prior to cutting the pile material.

18. The machine of claim 17, wherein the pile material is spaced from the band at the winding station.

19. The machine of claim 17, wherein the traveling element comprises at least one wire.

20. The machine of claim 17, wherein the traveling element comprises three wires.

21. The machine of claim 20, wherein two wires are disposed proximate a first side of the band and one wire is disposed proximate a second side of the band.

22. The machine of claim 21, wherein the fin material is disposed between the two wires and the band.

23. The machine of claim 21, wherein spacing between the two wires converges in a downstream direction, from the winding station to the slitter station.

24. The machine of claim 19, wherein the one wire is offset from a centerline of the band.

25. The machine of claim 12, wherein the attachment station comprises an ultrasonic welder.

26. The machine of claim 12, wherein the backer comprises a first backer element and a second backer element, such that two integral fin pile weatherstrips result when the fin material and the pile material are cut.

27. The machine of claim 12 further comprising a stationary element disposed between the fin material and the band to facilitate cutting the fin material and the pile material at the slitter station.

* * * * *